Patented Jan. 11, 1927.

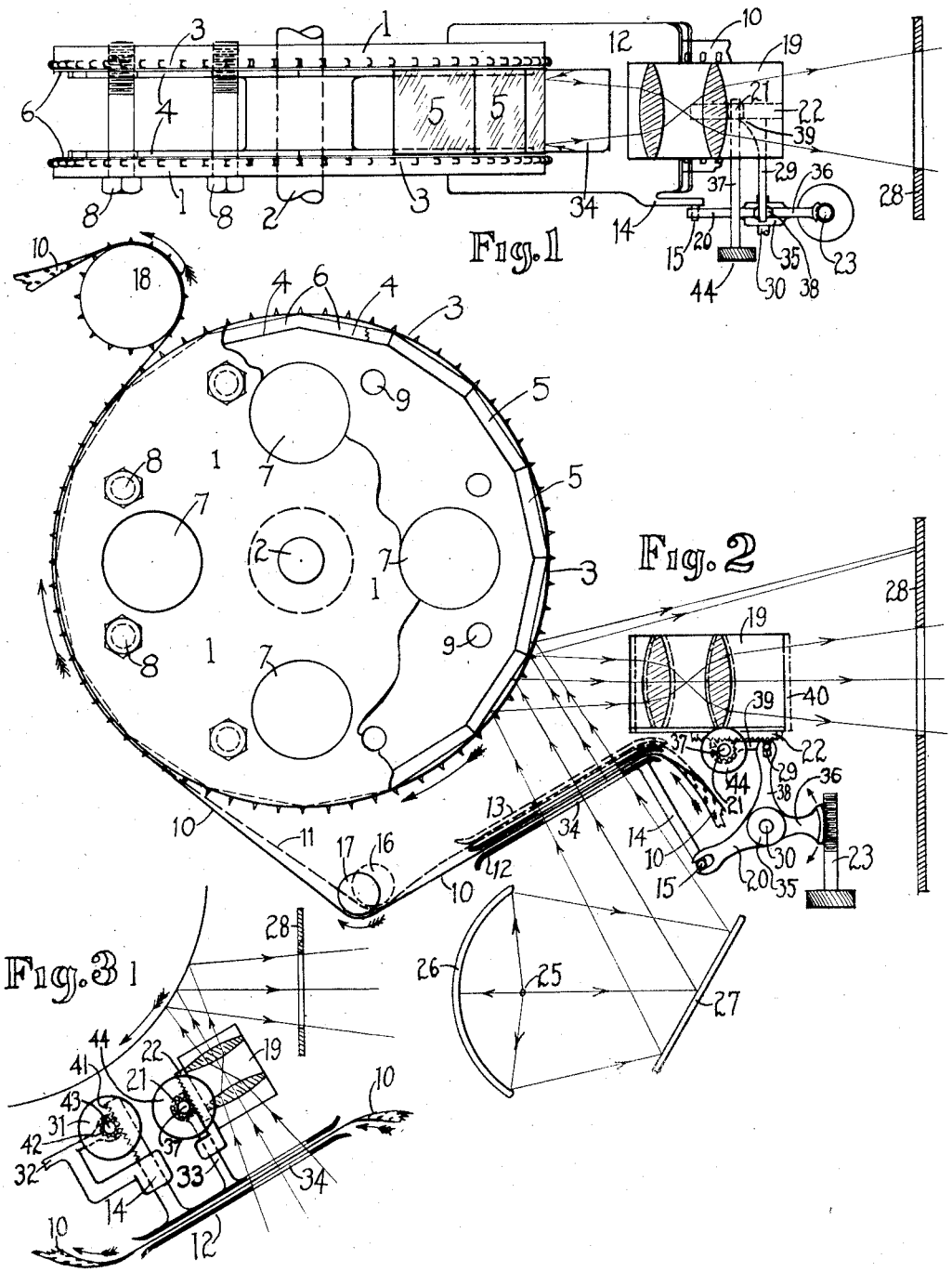

1,613,730

UNITED STATES PATENT OFFICE.

ISRAEL N. STEIGMAN, OF BROOKLYN, NEW YORK.

MOTION-PICTURE MACHINE.

Application filed April 30, 1924. Serial No. 709,965.

This invention relates to motion picture machines of the type wherein the film is continuously advanced during projection and wherein moving mirrors are used for rectification.

As is well known, a high degree of accuracy is required in the projecting mechanism of machines of this type. Such accuracy, if ever initially attained in machines heretofore devised, is soon lost, principally because of the effect of wear on the moving parts.

The variability in the size of the film base under different conditions presents further difficulties to accurate projection. For instance, the size of said base is affected by age, moisture, temperature variations, and tensile variations, and a very small variation in size is sufficient to blur the screen picture. Machines uncorrected for film size variations are for this reason commercially impractical.

Machines of the type referred to are open to substantially the universal objection that the relation between the machine and the screen is substantially fixed, and that such machines can be used only where it is possible to erect a projection booth at the distance from the screen, suitable for the particular machine by causing rectification to take place between the film and the objective. My invention is adapted for practically universal focus and is independent of the limitations heretofore associated with machines of this character. By replacing the objective with another of suitable focal length it becomes possible to project on the screen a picture of practically any desired size and at any practical distance. Furthermore, because of the proportions of the parts, my device is light enough to be readily portable.

My improved machine contains but a single moving part besides the film advancing means, so mounted and operated as to reduce the amount of wear to a minimum, and to eliminate intermediate mechanism between the film and the rectifier. Means, adjustable during the operation of the machine are also provided whereby the screen image can be maintained in clear definition in spite of the variations in the sizes of film prints.

In the illustrated embodiment of my invention,

Fig. 1 is a top plan view of my improved machine partly in section and with some of the members removed to show the underlying parts.

Fig. 2 is a side elevation of the same, and

Fig. 3 is a side elevation of a modified form of the adjusting and focusing mechanism.

The revoluble rectifier, above referred to as the moving part, comprises a pair of preferably webbed sprocket wheels 1, suitably mounted on the shaft 2 and spaced apart a sufficient distance to allow the insertion therebetween of a series of preferably plane mirrors 5. On the rim 3 of each of said wheels is formed sprocket teeth of the usual type adapted to engage the film 10 in the customary manner. For accurately positioning the mirrors 5 relatively to the center of rotation, and in exact angular relation, I provide a polygonal member 4, which is preferably a plinth integral with and projecting inwardly of the sprocket wheel 1. The faces of said plinth are accurately disposed at the desired distance from the center, and at the proper angular relation, and act as narrow shelves for supporting the ends of the inner faces of the mirrors 5 in exact predetermined position. While said mirrors are preferably arranged as closely as possible to the periphery of the wheels 1, they do not project beyond the root circle of the sprocket teeth, to avoid interference with the film 10.

The bolts 8, passed through holes as 9 in the webs of the wheels serve to maintain said wheels and said mirrors in accurately fixed relation. Washers 6, of heat resisting material, such as asbestos, are preferably interposed between the ends of said mirrors and said wheels for cushioning said mirrors on the tightening of said bolts, and for insulating said mirrors from the heat of said wheels. For cooling said wheels, which are exposed during the rotation thereof to the hot concentrated beam of light passing through the film, holes as 7 may be made in the webs thereof, through which holes air may circulate.

In that embodiment of my invention illustrated no means are provided for driving the rectifier unit, excepting the film 10 itself though it will be understood that the usual means provided for this purpose may be used if desired. Said film may be continuously fed by the wheels 18, or by means of suitable friction wheels, and causes said rectifier to rotate by engaging the rearmost sprocket teeth of the wheels 1.

The film first passes between the aperture guide plates 12 past the aperture or gate 34 thereof, thence around the adjusting cylinder 17, thence around the rearmost part of the circumference of the wheels 1, and finally around the forwarding wheel 18 or between the friction rollers as the case may be. The cylinder 17 is adjustable bodily in a direction parallel to the plane of the plates 12. Said cylinder may be made revoluble in order to reduce the resistance to the passage of the film thereabout, or it may be irrevolubly mounted and highly polished to eliminate rotational wear, and serves to vary the length of film between the plates 12 and the rectifier for "framing" the picture.

The film in the aperture 34 is illuminated by means of the reflectors 26 and 27 obtaining light from the source of illumination 25 and passing through the film. That mirror 5 on which the light beam impinges, reflects said beam through the objective 19 (Fig. 2), and through the screen 28, rectifying or compensating for the movement of the film as said film passes by the aperture 34, in a manner now well understood, so that the image on the screen remains stationary until it is displaced by the next picture.

When the size of the film prints varies, even though very slightly, the relation between the picture projecting instrumentalities, if correct for film of one size, is incorrect for film of another size, and hence the screen pictures appear horizontally blurred.

It is, therefore, desirable to provide mechanism whereby the projecting means may be instantaneously adjusted during the operation of the machine for all sizes of film prints.

The means illustrated herein for the above named purpose consists of mechanism for moving the plates 12 and the objective 19 simultaneously in the direction of the axis of the optical system, which for said plates is substantially at right angles to the plane of the plates 12. Said plates 12 are moved until the picture on the screen becomes clearly defined and the blur is eliminated. In other words, the correct optical compensating relation of the parts is restored for the size of the particular film prints being projected. It will be understood that the adjustment just described need seldom be made at different points in the same reel, though said adjustment is easily possible, unless parts of said reel have been printed on bases of various origins and under different conditions, thereby causing prints at different points of said reel to vary substantially in size.

Referring to Fig. 2, the arm 14 extending from the plate 12 has a pin 15 at the extremity thereof. Said pin is engaged by the arm 20 of the bell crank lever 35, which is mounted on the shaft 30, suitably supported in the frame of the machine. The arm 36 of said lever has suitable worm teeth in the periphery thereof, which teeth engage the worm 23, having a suitable thumb nut thereon for manual adjustment and suitably supported in the machine. The objective 19 is illustrated in Fig. 2 as being interposed between the rectifier and the screen, but is illustrated in Fig. 3 as being interposed between the film and the rectifier. In either case, it will be seen that it is desirable to move the objective 19 bodily a sufficient amount to maintain constant the optical distance between said objective and the opening 34. Toward this end, a rack 22 is secured to said objective, said rack being operated by the pinion 21 either independently as by means of the thumb nut 44 on the pinion shaft 37, or simultaneously with the adjustment of the plate 12. In Fig. 2, said rack is moved through the arm 38 of the bell crank lever 35. Said arm 38 engages the pin 29 near the extremity of the arm 39 carrying the pinion shaft 37, the pinion 21, the rack 22 and the objective 19, whereby rotation of said bell crank lever moves the arm 39, the pinion 21, rack 22, and the objective 19, as a unit. It will be understood that during the adjustment just described there is sufficient friction on the pinion shaft 37 to prevent said shaft and the pinion thereon from rotating. The parts are so proportioned that the objective 19 moves away from the rectifier a distance equal to that which the plate 12 moves toward the rectifier whereby the total optical distance between the objective and the film is maintained constant, as indicated by the dotted line position 40 of the objective and the dotted line position 13 of the plates 12 (Fig. 2).

Referring to Fig. 3, the rack teeth as 41 cut on the arm 14 are engaged by a pinion 42 on the pinion shaft 43, said shaft being suitably supported as by means of the bracket 32 on the machine frame. Said shaft 43 is rotated by means of the thumb nut 31, whereby the plates 12 are moved toward or from the rectifier as desired.

On the movement of said plates, the arm 33 extending therefrom, and carrying the objective 19 through the rack and pinion operatively connected therewith, is also moved together with the parts 19, 22, 21 and 37 as a unit.

In either form of adjusting means, the objective 19 is caused to focus the image on the screen before, after or during adjustment by means of the pinion thumb nut 44.

The optical axis of my machine is in a plane perpendicular to the axis of rotation of the rectifier. By the arrangement of the various optical instrumentalities along said optical axis, I have been able to reduce the optical system to its simplest form, wherein the image is reflected but once.

In the preferred form of my machine as shown in Fig. 2, rectification of the moving beam of light takes place between the film gate and the objective 19, whereby the objective may be used to focus the beam on the screen in the ordinary manner at no matter what point the screen is positioned. It will be noted further that the objective 18 and the film aperture 34 is generally below the axis of rotation of the rectifier, whereby I am enabled to project the pictures in proper position and in proper sequence.

It will be seen that the construction of my improved rectifier is such as to provide extreme accuracy not only in the positioning of the reflecting mirrors 5, but in the maintenance of said accuracy under the hard conditions of practical use. To help maintain the accuracy of projection, the velocity of the film may be maintained constant by suitably weighting the wheels 1 and 18 near the periphery thereof, so that said wheels may be caused to rotate at a uniform rate in spite of possible inaccuracies in the meshing of the sprocket with the film.

Furthermore, the extreme simplicity of the optical system provides maximum efficiency in projection with the least absorption of light, and allows the use of a minimum number of parts, none of which are subjected constantly to the distorting effect of concentrated heat.

Finally it will be seen that a quick, simple and dependable adjustment is provided to take care of inequalities in film sizes, and for varying distances between the projecting booth and the screen, and that adjustment may be made even though the machine is in operation.

While I have described my improved machine in connection with the projection of pictures, it will be understood that with slight changes well understood by those skilled in the art, my invention is equally advantageous for use as a camera, and that changes in the structure and arrangement of the parts may be made without departing from the spirit thereof.

I claim:

1. In a motion picture machine, a revoluble film-operated prismatic rectifier comprising means engageable by the film for rotating said reflector on the movement of said film, and a series of outwardly reflecting mirrors arranged so that the distance from the axis of said rectifier to the outermost edges of said mirrors is substantially equal to the distance from said axis to said film engaging means.

2. In a motion picture machine, a revoluble rectifier comprising a pair of sprocket wheels, a series of reflectors arranged between said wheels and means for securing said wheels together for clamping said reflectors therebetween.

3. In a motion-picture machine, a film-engageable revoluble reflector comprising a pair of sprocket wheels, a series of reflectors near the periphery of said wheels, and means for adjustably securing said wheels together with said reflectors therebetween.

4. In a motion picture machine, a revoluble rectifier comprising a pair of sprocket wheels adapted to be engaged by a film, a series of outwardly reflecting reflectors arranged in the form of a regular polygon near the periphery of said wheels, and threaded means for securing said wheels together with said reflectors therebetween.

5. In a motion picture machine, circular film-engaging means and a series of reflectors arranged in a closed polygon adjacent to and of substantially the same diameter as said means.

6. In a motion picture machine, a pair of wheels adapted to engage a film, a series of reflectors arranged in the form of a regular polygon between and near the periphery of said wheels, and means for securing said wheels together with said reflectors held between the inner faces of said wheels for rotation as a unit.

7. In a motion picture machine, a revoluble reflector comprising film engaging means and an outwardly reflecting prism of substantially the same diameter as said means held in place by, between and adjacent to said film engaging means.

8. In a motion picture machine, a pair of film engaging wheels, reflecting means arranged between and near the periphery of said wheels, and means for securing said wheels together with said reflecting means frictionally held therebetween.

9. In a motion picture machine, a pair of sprocket wheels, a series of reflectors arranged circumferentially between said wheels, means on said wheels for supporting said reflectors in accurate predetermined position, and means for securing said wheels together with said reflectors therebetween.

10. In a motion picture machine, a pair of sprocket wheels adapted to be rotated by the movement of a film, a polygonal plinth of slightly less diameter than that of said wheels, projecting from each of said wheels toward the other of said wheels, a series of outwardly reflecting mirrors each resting near the end thereof on one of the faces of said plinth, and bolts for drawing said wheels together and for causing said wheels to exert pressure on and to hold the ends of said mirrors in place.

11. In a motion picture machine, a series of reflectors arranged in the form of a polygonal prism, a pair of revoluble members, ledges on said members for supporting said reflectors, and means for drawing said members together for maintaining the ends of said reflectors in place therebetween.

12. In a motion picture machine, a revoluble rectifier, a film gate below the axis of rotation of said rectifier, an objective below the axis of rotation of said rectifier, and means for simultaneously adjusting said gate and said objective in opposite directions.

13. In a motion picture machine, means for continuously advancing a film, an apertured plate in the path of said film, a revoluble rectifier in spaced relation to said plate adapted to be engaged by said film, a series of reflectors arranged in the form of a regular polygonal prism in said rectifier, means for projecting light through the film in the aperture of said plate on to said rectifier, an objective adjustable bodily, and means for adjusting said plate relatively to said rectifier.

14. A motion picture machine comprising a revoluble reflector, a film gate, an objective, and means for simultaneously adjusting said gate and said objective whereby said machine may project and focus pictures at various distances.

15. In a motion picture machine, means for continuously advancing a film, an apertured plate in the path of said film a revoluble rectifier comprising a pair of sprocket wheels adapted to be engaged by the advancing film, and a series of reflectors carried by said wheels, means for projecting a beam of light through the film in the aperture of said plate on to said rectifier, and an objective adjustable bodily in the direction of the axis thereof.

16. In a motion picture machine, a revoluble polygonal prismatic outwardly reflecting reflector, a film gate outside of said reflector, means for projecting the picture in said film gate on to a screen comprising an objective cooperating with said reflector and coaxially arranged in relation to the optical axis of said projecting means, and means for adjusting said gate and said objective axially of the optical system while maintaining constant the optical distance between said gate and said objective.

17. In a motion picture machine, means for continuously advancing a film, a revoluble polygonal reflector, a film gate, means for projecting a beam of light through said gate and on to said reflector, an objective arranged coaxially with the optical system, means for adjusting said gate and said objective as a unit relatively to said reflector, and means for adjusting said objective independently of said gate.

18. In a motion picture machine, means for continuously advancing a film at a uniform rate, a rectifier adapted to be engaged by the advancing film, an optical system having the axis thereof in a plane perpendicular to the axis of rotation of said rectifier for focusing a beam passed through said film, and means for adjusting said optical system to compensate for variations in film size.

19. In a motion picture machine, means for continuously advancing a film at a uniform rate, means for projecting a beam of light through a portion of said film during the movement of said film, means engaged by the film for rectifying said beam to cause said beam to appear stationary on a screen, means for focusing said beam on a screen, and means for oppositely varying the respective distances of said focusing means and of the lighted portion of the film from said rectifying means.

20. In a motion picture machine, means for continuously advancing a film, means for projecting a beam of light through a portion of the advancing film, means arranged with the axis thereof in a plane perpendicular to the axis of said beam, operated by said film for rectifying said beam, and means for varying the distance of the lighted portion of said film from said rectifying means.

21. In a motion picture machine adapted to focus and project pictures at varying distances from a screen, a revoluble rectifier, a film gate and an objective arranged below the axis of rotation of said rectifier, and means for adjusting said gate and said objective in opposite directions.

22. In a motion picture machine, a film gate, an optical system comprising a revoluble rectifier arranged with the axis thereof perpendicular to the plane of the axis of said system, and an objective and means for moving said gate and said objective along the optical axis of said system during the operation of said machine for compensating for variations in film size.

23. In a motion picture machine, a film gate, a revoluble rectifier, an objective, means for moving said film gate and said objective simultaneously in opposite directions along the axis of said gate and said objective respectively, and means for focusing said objective independently of said gate.

ISRAEL N. STEIGMAN.